May 28, 1963 F. VAN STEENHOVEN 3,091,425

SNAP NUT FASTENER

Filed April 27, 1961 2 Sheets-Sheet 1

INVENTOR.
FRANK VAN STEENHOVEN
BY Nolte & Nolte
ATTORNEYS

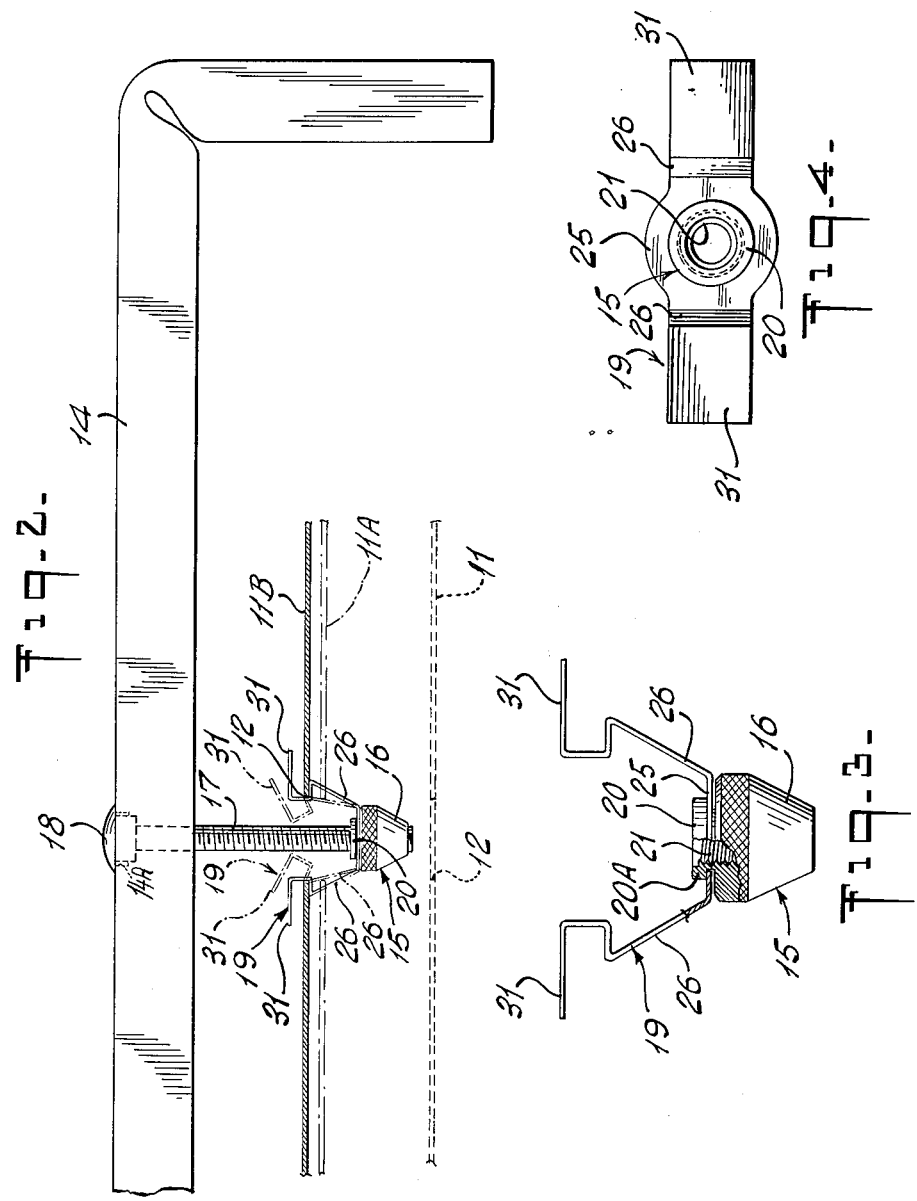

United States Patent Office 3,091,425
Patented May 28, 1963

3,091,425
SNAP NUT FASTENER
Frank Van Steenhoven, Newark, Ohio, assignor to Holophane Company, Inc., New York, N.Y., a corporation of Delaware
Filed Apr. 27, 1961, Ser. No. 106,134
2 Claims. (Cl. 248—327)

The present invention relates to support fasteners for recessed ceiling fixtures and is particularly directed to a snap-nut fastener construction for supporting Troffer light fixtures.

It is a principal object of the invention to provide a support fastener for ceiling fixtures, such as Troffer light fixtures, which support fasteners will automatically support the fixture without the necessity of the installer holding the fixture while he, or one helping him, fastens the fixture in place.

The support fastener of the invention is particularly adapted for various installations which utilize cross-support members adajacent a ceiling for supporting the fixture therefrom. In such installations the support of the invention may be incorporated into the cross-support members prior to installation. It should be understood that the invention will lend itself to other types of installation where other means are provided adjacent the ceiling for securing a fixture body thereto.

In one form of the invention, the support takes the form of a snap-nut fastener depending from the main support member, such as a cross-support member, in the ceiling. The fastener is adjustable vertically relative to the main support member to accommodate vertical adjustment of the fixture when installed. A snap-nut fastener, in accordance with the invention, provides a vertical spring element around which the standard openings in a fixture back portion will fit and which spring element will depress upon upward vertical movement of the back portion. A recessed or bent portion of the spring element is provided at its upper end where the fixture will be restrained and supported. The spring element is mounted on a nut member threadedly engaging a bolt extending downwardly from the main support beam or member. This arrangement permits the vertical adjustment of the nut and spring, and, therefore, of the fixture when the fixture is supported by the snap-nut fastener.

As it is an object of the invention to provide such a support which will not scratch the fixture or its finishing paint from around the edges of the apertures in the back of the fixture, the invention provides for relative rotational movement between the spring member and the nut member about the vertical axis of these elements as well as about the vertical axis of the threaded bolt.

These and further objects of the invention will readily be understood with reference to the following detailed description of a specific embodiment thereof with reference to the accompanying drawings which form a part thereof and in which:

FIG. 2 is an enlarged side elevational view of one of the support elements of the invention shown in FIG. 1;

FIG. 3 is an elevational view of the spring and nut assembly of the support element of the invention; and FIG. 4 is a plan view of the spring and nut assembly shown in FIG. 3.

Figure 1:
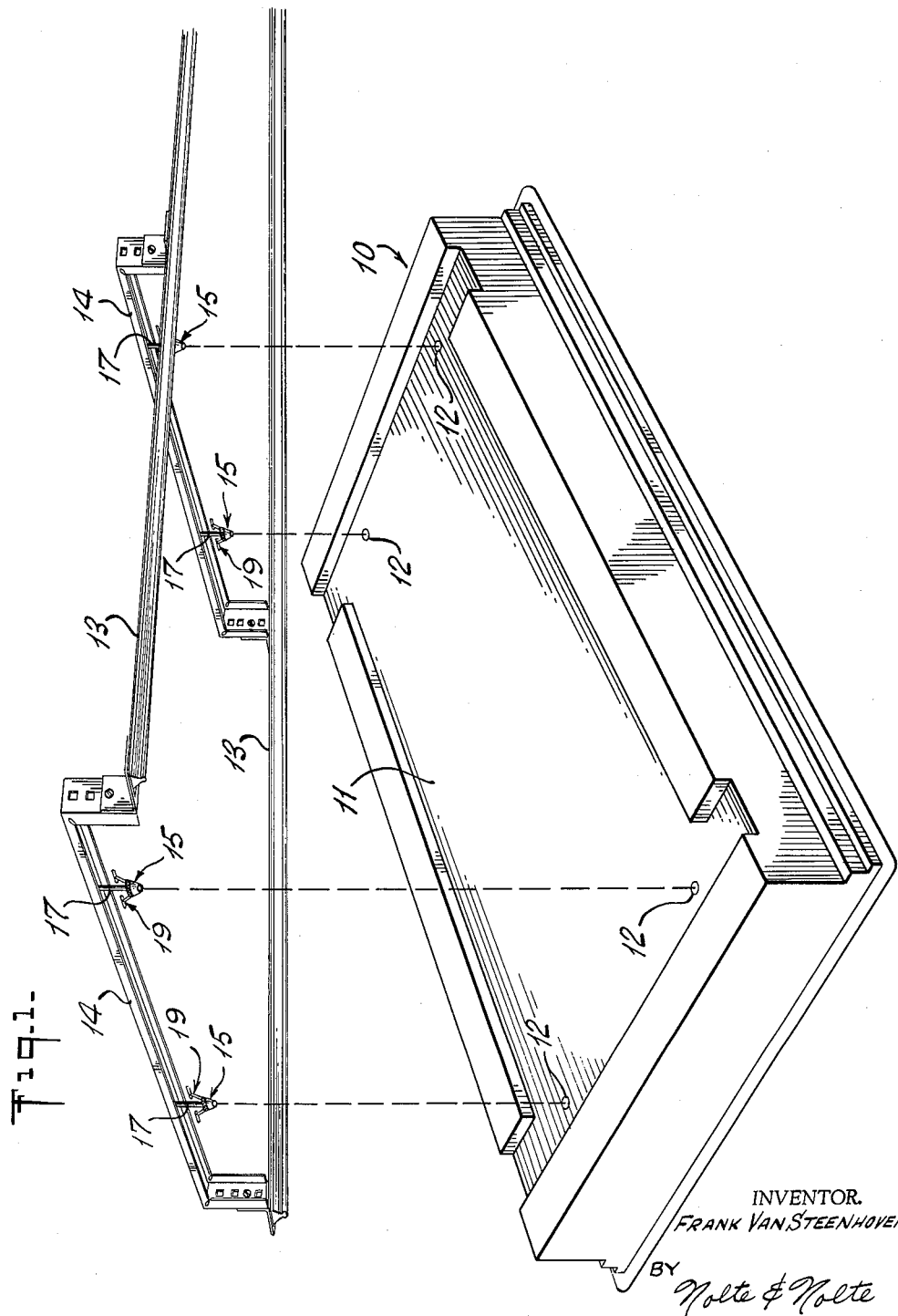
FIG. 1 is a perspective view of a typical Troffer light fixture installation with the fixture and support means therefor exploded apart to show the fixture support fastener of the invention.

The installation shown in FIG. 1 includes a Troffer light fixture 10 including a back portion 11 having a pair of apertures 12 at either end thereof. Parallel and longitudinally extending ceiling beams 13 support cross-support channels 14, longitudinally spaced therealong to overlie either end of the fixture 10 in the area of the apertures 12 in the back portion 11 thereof.

Transversely spaced snap-nut fasteners 15 depend from the cross-channels 14 and are disposed in the path of the fixture apertures 12 when the fixture 10 is moved vertically toward the supports 13, 14, when being installed.

In FIG. 2, it is seen that each snap fastener 15 comprises a nut member 16 which is smaller in diameter than the diameter of the back portion aperture 12, and which is threadedly engaged at the end of a carriage bolt 17, the carriage bolt depending from the cross-channel 14 through an aperture 14A thereof where it is supported via its enlarged head portion 18. The carriage bolt 17 may be swaged adjacent its head portion 18 within an opening in the channel member 14 to provide a thickened area at the opening to restrain the bolt 17 against rotational and vertical movement.

The snap-nut fastener 15 is also provided with a spring element 19 which is provided with an annular base portion 25 (FIG. 4), the inner edge of which surrounds a boss portion 20 extending upwardly from the nut 16 adjacent its inwardly threaded opening 21. The boss 20 is swaged to provide a lip 20A overlying the inner circular edge edge of the annular portion 25 of the spring member 19. In this manner the spring member 19 is permitted rotational movement about the axis of the nut 16 and yet is retained in assembled relation with the nut 16.

Extending upwardly and outwardly in diverging paths, which extend outboard of the edge of the aligned back portion apertures 12, are lateral spring extensions 26 which terminate in inward bends where the upper portions of the lateral extensions 26 are bent upwardly then outwardly to form recesses or support areas for the back 11 of the fixture 10.

In FIG. 2, the back portion 11 is shown just prior to the entry of the snap-nut fastener 15 into the aperture 12 of the back portion 11 as the fixture 10 is being lifted vertically. The back portion 11A shows the position of the back portion 11 and the spring element 19 as the edges of the aperture 12 depress the spring 19 as it moves upwardly toward the recessed portions 30 of the spring member 19. The supported position of the back member 11 is shown at 11B which illustrates the inner edges of the aperture 12 to be overlying the recessed portions 30 of the lateral extensions 26 of the spring member 19. The upper laterally outwardly extending portions 31 of the spring member 19 act to halt vertical upward movement of the fixture 10 as the back portion 11 of the fixture 10 is moved vertically to permit the spring member 19 to underlie and support the back portion 11 within the recessed portion 30 of the spring member 19.

It will be noted that the fixture 10 may, when installed, be moved vertically upwardly and downwardly for final exact vertical adjustment by merely turning the nut 16 upon the carriage bolt 17. This adjustment will not result in the turning of the spring element 19, in which case the fastener would damage the finish adjacent the apertures 12, but, the spring member 19 and nut 16 are permitted movement relative to one another via their complementary mounting means comprising the annular portion 25 of the spring 19 and the swaged boss 20 of the nut providing an overlying lip portion 20A to restrain the spring member 19 from vertical movement relative to the nut member.

A specific embodiment of the invention has been described and as many modifications will occur to those skilled in the art as to the practicing of the invention.

The following claims are meant to define the full spirit and scope of the invention.

I claim:

1. A fastener element for in situ insertion in an aperture of a backing plate and the like, comprising an elongated outwardly threaded member and inwardly threaded nut member, a spring member, said outwardly threaded member and said nut member being in threaded engagement, said spring member and said nut member providing complementary mounting means for permitting rotational movement of said spring member about the longitudinal axis of said threaded members, said complementary means being formed to restrain relative axial movement between said spring member and said nut member, said spring member providing outwardly diverging portions and recessed support areas at the end of said outwardly diverging portions, said nut member being smaller in width than the distance between said outwardly diverging portions, whereby said nut member and said diverging portions may be inserted in the backing plate aperture and passed therethrough to position said recessed support areas of said spring member to snap onto the backing plate.

2. A fastener and support for ceiling fixtures of the type having a back provided with a fastener receiving aperture, said fastener support being adapted for depending from a support element adjacent a ceiling and comprising, an elongated and downwardly extending outwardly threaded member, an inwardly threaded nut member threadedly engaged at the end of said outwardly threaded member, said nut member being dimensioned for passage through the aperture in the back of the fixture, spring means mounted adjacent the upper surface of said nut member for relative rotation about the vertical axis thereof, means on said spring means and on said nut member for restraining relative axial movement therebetween, said spring means including laterally and upwardly diverging portions extending above said nut member, said spring means further providing bent portions at its upper end and forming thereby support means for receiving the back of the fixture adjacent the edges of the aperture in the back of said fixture, said bent portions further providing lateral extensions at the upper end of said spring means, said lateral extensions preventing vertical upward movement of the back of the fixture past the fastener support.

References Cited in the file of this patent

UNITED STATES PATENTS

| | | |
|---|---|---|
| 2,376,167 | Mitchell | May 15, 1945 |
| 2,495,037 | Tinnerman | Jan. 17, 1950 |
| 2,667,200 | Bedford | Jan. 26, 1954 |